(12) United States Patent
Wake et al.

(10) Patent No.: US 9,711,813 B2
(45) Date of Patent: Jul. 18, 2017

(54) FUEL CELL SYSTEM AND START UP CONTROL METHOD FOR THE FUEL CELL SYSTEM

(75) Inventors: Chihiro Wake, Shioya-gun (JP); Koichiro Miyata, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 2394 days.

(21) Appl. No.: 11/563,895

(22) Filed: Nov. 28, 2006

(65) Prior Publication Data

US 2007/0122663 A1    May 31, 2007

(30) Foreign Application Priority Data

Nov. 30, 2005  (JP) .................... 2005-345776

(51) Int. Cl.
H01M 8/04          (2016.01)
H01M 8/0438        (2016.01)
H01M 8/04119       (2016.01)
H01M 8/04223       (2016.01)
H01M 8/0432        (2016.01)
H01M 8/04746       (2016.01)
H01M 8/04955       (2016.01)
H01M 8/0662        (2016.01)
H01M 8/04089       (2016.01)
H01M 8/0444        (2016.01)

(52) U.S. Cl.
CPC ... *H01M 8/04395* (2013.01); *H01M 8/04179* (2013.01); *H01M 8/04223* (2013.01); *H01M 8/04253* (2013.01); *H01M 8/04343* (2013.01); *H01M 8/04388* (2013.01); *H01M 8/04753* (2013.01); *H01M 8/04955* (2013.01); *H01M 8/0662* (2013.01); *H01M 8/0444* (2013.01); *H01M 8/04097* (2013.01); *H01M 8/04231* (2013.01); *H01M 8/04365* (2013.01); *H01M 8/04761* (2013.01)

(58) Field of Classification Search
USPC ................................... 429/13, 429
See application file for complete search history.

(56) References Cited

U.S. PATENT DOCUMENTS 6,379,827 B1 * 4/2002 Cipollini ............. H01M 8/0245
                                                       429/429
7,563,528 B2    7/2009 Inai et al.
(Continued)

FOREIGN PATENT DOCUMENTS

JP    2001-351666 A    12/2001
JP    2004192919   *    7/2004  ............. H01M 8/04
JP    2005-251441 A    9/2005

OTHER PUBLICATIONS

Japanese Office Action dated Jan. 10, 2012, issued in corresponding Japanese Patent Application No. 2006-253837.(w/partial English translation).

*Primary Examiner* — Scott J Chmielecki
(74) *Attorney, Agent, or Firm* — Westerman, Hattori, Daniels & Adrian, LLP

(57) ABSTRACT

A scavenging process is performed on the anode side by opening an air supply valve to remove liquid droplets in a fuel gas flow field using the compressed air from an air compressor. During the scavenging process, when a start up signal from an ignition switch is received, the start up of a fuel cell is prohibited until the gas in the fuel gas flow field is replaced completely by air.

14 Claims, 12 Drawing Sheets

(56) References Cited

U.S. PATENT DOCUMENTS

| | | | | |
|---|---|---|---|---|
| 2002/0076582 A1* | 6/2002 | Reiser | ............... | H01M 8/04223 |
| | | | | 429/429 |
| 2002/0076583 A1* | 6/2002 | Reiser | ............... | H01M 8/04231 |
| | | | | 429/429 |
| 2004/0146755 A1* | 7/2004 | Meredith | ............ | H01M 8/0494 |
| | | | | 429/427 |
| 2005/0136297 A1* | 6/2005 | Inai | .................... | H01M 8/04097 |
| | | | | 429/429 |
| 2005/0221148 A1* | 10/2005 | Goebel | ............. | H01M 8/04014 |
| | | | | 429/415 |

* cited by examiner

FUEL CELL SYSTEM AND START UP CONTROL METHOD FOR THE FUEL CELL SYSTEM

BACKGROUND OF THE INVENTION

Field of the Invention

The present invention relates to a fuel cell system and a start up control method for the fuel cell system. In the fuel cell system, scavenging of at least one of a fuel gas flow field and an oxygen-containing gas flow field is performed using a scavenging gas such as air at the time of stopping power generation or after stopping power generation to prepare for the start of the next operation of the fuel cell system at low temperature such as the temperature below the freezing point.

Description of the Related Art

For example, a polymer electrolyte fuel cell employs a membrane electrode assembly which includes an anode (fuel electrode) and a cathode (air electrode), and a polymer electrolyte membrane interposed between the electrodes. The electrolyte membrane is an ion exchange membrane. The membrane electrode assembly is sandwiched between a pair of separators. A fuel gas flow field is formed between the anode and one of the separators, and an oxygen-containing gas flow field is formed between the cathode and the other of the separators. In use, normally, a predetermined numbers of the membrane electrode assemblies and separators are stacked together to form a fuel cell stack.

In the fuel cell, a fuel gas such as a hydrogen-containing gas is supplied to the fuel gas flow field. The fuel gas flows through the fuel gas flow field along the anode. The catalyst of the anode induces a chemical reaction of the fuel gas to split the hydrogen molecule into hydrogen ions and electrons. The hydrogen ions move toward the cathode through the suitably humidified electrolyte membrane, and the electrons flow through an external circuit to the cathode, creating DC electrical energy. Further, in the fuel cell, an oxygen-containing gas such as air is supplied to the oxygen-containing gas flow field, and the oxygen-containing gas flows along the cathode for reaction. At the cathode, hydrogen ions from the anode combine with the electrons and oxygen to produce water. Water is also retained at the anode due to back diffusion from the cathode or high humidification of the fuel gas.

If water at any of the electrodes becomes excessive, water clogging may occur. Thus, in the fuel cell system of this type, at the time of stopping operation of the fuel cell system, a technique of scavenging both sides of the anode and the cathode is proposed. In the anode/cathode scavenging technique, the oxygen-containing gas is supplied to the anode as well as the cathode for removing, e.g., water produced in power generation from the membrane electrode assembly or the separator in the fuel cell (see Japanese Laid-Open Patent Publication No. 2001-351666).

Further, after the fell cell system is stopped, when the outside temperature decreases, and operation of the fuel cell system is started at low temperature such as the temperature below the freezing point, before warming up the fuel cell, the ignition switch may be turned off by an operator such as a driver and a stop signal may be outputted from the ignition switch. Therefore, if operation of the fuel cell system is stopped after operation of the fuel cell system is started at the temperature below the freezing point, and power generation is performed for a short period of time, stated otherwise, if operation of the fuel cell system is stopped by the driver's operation in a short period of time after operation of the fuel cell is started at the temperature below the freezing point, it has been found that, in some cases, the fuel cell system becomes unstable due to the sufficient activity of the electrolyte membrane.

In Japanese Patent Application No. 2005-307193, the applicant of the present application proposes a technique for eliminating the instability beforehand to reliably starting the next operation stably, as the two stage scavenging process technique or the three stage scavenging process technique.

In the two stage scavenging process technique, or the three stage scavenging process technique, even if there is a request to stop operation of the fuel cell system after power generation for a short period of time at low temperature, when the request is received, it is possible to reliably perform the scavenging process, and it is possible to reliably restart the next operation of the fuel cell system at low temperature such as the temperature below freezing point.

In the technique disclosed in Japanese Laid-Open Patent Publication No. 2001-351666 or in the technique proposed in Japanese Patent Application No. 2005-307193, after the stop signal from the ignition switch is received, in the middle of the scavenging process of supplying the scavenging gas such as the oxygen-containing gas to the anode, in order to restart operation of the fuel cell, a start up signal may be outputted from the ignition switch again.

However, in the case of Japanese Laid-Open Patent Publication No. 2001-351666, after the stop signal from the ignition switch is received, in the middle of the scavenging process of supplying the scavenging gas such as the oxygen-containing gas to the anode, if operation of the fuel cell is restarted by supplying the fuel gas to the anode immediately after reception of the start up signal from the ignition switch, since the gas replacement by the fuel gas is not performed accurately at the anode, the desired power generation stability at the time of restarting operation may not be obtained disadvantageously.

Further, during the second stage scavenging process and the three stage scavenging process after the stop signal from the ignition switch is received, if the start up signal is outputted again from the ignition switch, and operation of restarting the fuel cell is awaited until these scavenging processes are finished, since it takes considerable time, the operator may feel a sense of discomfort.

SUMMARY OF THE INVENTION

The present invention has been made taking the above problems into consideration, and an object of the present invention is to provide a fuel cell system and a start up control method for the fuel cell system in which after the stop signal from the ignition switch is received, even if a start up signal from the ignition switch is received in the middle of the scavenging process, the desired power generation stability at the time of restarting operation of the fuel cell can be obtained.

Another object of the present invention is to provide a fuel cell system and a start up control method for the fuel cell system in which after the stop signal from the ignition switch is received, even if a start up signal from the ignition switch is received in the middle of the scavenging process, the desired power generation stability at the time of restarting operation of the fuel cell can be obtained, while reducing the time required for restarting operation of the fuel cell.

According to the present invention, a fuel cell system includes a fuel cell operated for power generation consuming a fuel gas supplied to an anode and an oxygen-containing gas supplied to a cathode, start up/stop means for outputting a start up signal for starting operation of the fuel cell and a stop signal for stopping operation of the fuel cell, and anode scavenging means for scavenging the fuel gas at the anode using a scavenging gas when the stop signal is received.

Further, the fuel cell system includes replacement determination means for determining that the fuel gas at the anode has been replaced by the scavenging gas, and start up prohibition means for prohibiting the start up of the fuel cell during a period in which the fuel gas at the anode has not been replaced by the scavenging gas, when scavenging of the anode is performed using the scavenging gas in response to the stop signal, and the start up signal is received during the scavenging of the anode.

During the scavenging of the anode using the scavenging gas, when the start up signal is received, during the period in which the fuel gas at the anode has not been replaced by the scavenging gas, the start up of the fuel cell is prohibited. Therefore, it is possible to easily perform the fuel gas replacement at the time of start up as usual. Thus, power generation stability, i.e., the performance of starting operation is not degraded.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
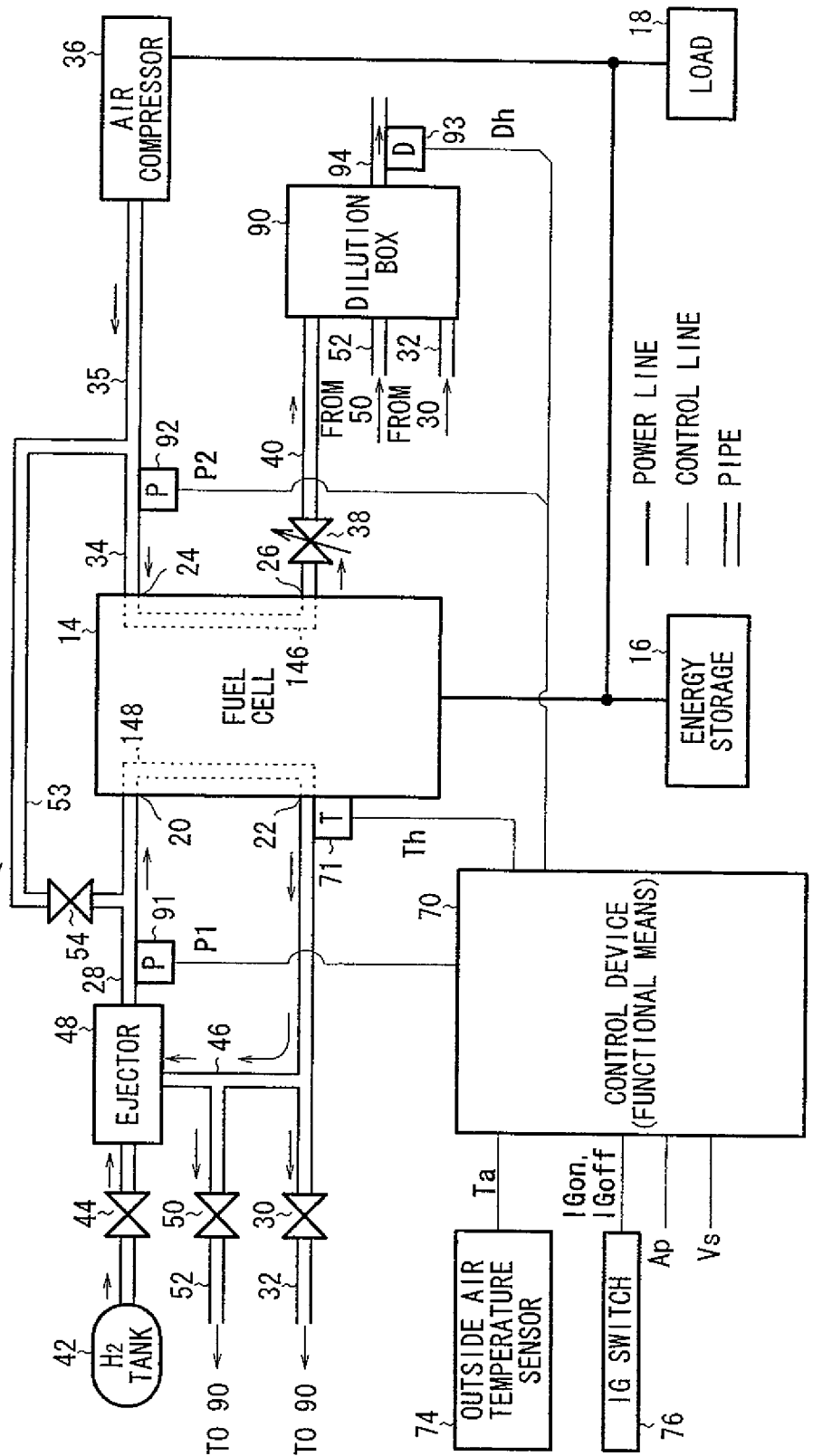
FIG. 1 is a diagram schematically showing structure of a fuel cell vehicle equipped with a fuel cell system according to an embodiment of the present invention.

FIG. 1 is a diagram schematically showing structure of a fuel cell vehicle 12 equipped with a fuel cell system 10 according to a first embodiment of the present invention.

Basically, the fuel cell vehicle 12 includes a fuel cell 14, an energy storage 16, a load 18 including a motor driven for traveling of the fuel cell vehicle 12, and an auxiliary device such as an air compressor 36. The energy storage 16 is charged by power generation current of the fuel cell 14, and assists the output of the fuel cell 14.

The fuel cell 14 has stack structure formed by stacking a plurality of cells each including an anode, and a cathode, and a solid polymer electrolyte membrane interposed between the anode and the cathode. Each cell of the fuel cell 14 includes a membrane electrode assembly employing a solid polymer electrolyte membrane, and metal separators sandwiching the membrane electrode assembly. One of the separators has an oxygen-containing gas flow field (hereinafter also referred to as the "reactant gas flow field") 146 on its surface facing the cathode of the membrane electrode assembly, and the other of the separators has a fuel gas flow field (hereinafter also referred to as the reactant gas flow field") 148 on its surface facing the anode.

The fuel cell 14 has a hydrogen supply port 20 for supplying a fuel gas such as a hydrogen ($H_2$) gas to the anode through the fuel gas flow field 148 of the fuel cell 14, a hydrogen discharge port 22 for discharging an exhaust gas from the fuel gas flow field 148 of the fuel cell 14 (the exhaust gas contains the hydrogen gas which has not been consumed in the power generation), an air supply port 24 for supplying the oxygen-containing gas such as air to the cathode through the oxygen-containing gas flow field 146 of the fuel cell 14, and an air discharge port 26 for discharging the air containing unconsumed oxygen from the oxygen-containing gas flow field 146 of the fuel cell 14.

A temperature sensor 71 as temperature detection means is provided near the hydrogen discharge port 22. The temperature sensor 71 measures the temperature Th of the gas in the hydrogen discharge port 22.

A hydrogen supply channel 28 is connected to the hydrogen supply port 20. An ejector 48 is provided in the hydrogen supply channel 28 through a pressure sensor 91 for detecting (measuring) the pressure P1 of the gas in the hydrogen supply channel 28. A hydrogen tank 42 stores a high pressure hydrogen, and the hydrogen gas is supplied from the hydrogen tank 42 to the ejector 48 through a hydrogen supply valve 44. The ejector 48 supplies the hydrogen gas to the fuel cell 14 through the hydrogen supply channel 28 and the hydrogen supply port 20. Further, the ejector 48 sucks the exhaust gas containing the unconsumed hydrogen gas which has not been consumed in the fuel cell 14 through a hydrogen circulation channel 46 connected to the hydrogen discharge port 22. The exhaust gas sucked by the ejector 48 is supplied again to the fuel cell 14.

A hydrogen purge valve 30 used at a relatively large flow rate is provided in the hydrogen circulation channel 46. The hydrogen purge valve 30 is opened as necessary. When the hydrogen purge valve 30 is opened, the fuel gas containing water retained in the anode and the nitrogen gas mixed into the anode from the cathode through the electrolyte membrane is discharged to the outside through a hydrogen purge channel 32, a dilution box 90, and a discharge channel 94. Thus, the power generation stability is achieved. Further, a drain valve 50 is provided in the hydrogen circulation channel 46. The drain valve 50 used at a relatively small flow rate discharges the exhaust gas including a hydrogen gas and water retained in a catch tank (not shown) in the hydrogen circulation channel 46 to the outside through a discharge channel 52, the dilution box 90, and the discharge channel 94.

A hydrogen concentration sensor 93 for detecting (measuring) the hydrogen concentration Dh in the exhaust gas is provided in the discharge channel 94.

An air supply channel 34 is connected to the air supply port 24. An air compressor 36 is connected to the air supply channel 34 through a pressure sensor 92 for detecting (measuring) the pressure P2 of the gas in the air supply channel 34. The air compressor 36 includes a compressor motor for compressing the atmospheric air from the outside, and supplying the compressed air to the fuel cell 14.

Further, a back pressure control valve 38 is provided at the air discharge port 26. The back pressure control valve 38 regulates the pressure of the air supplied from the air compressor 36 to the fuel cell 14 through the air supply channel 34 and the air supply port 24. The air discharge port 26 of the fuel cell 14 is connected to the outside through the back pressure control valve 38, an air discharge channel 40, the dilution box 90, and the discharge channel 94.

The dilution box 90 dilutes the fuel gas (exhaust gas) supplied through the hydrogen purge channel 32 and the discharge channel 52 by the oxygen-containing gas supplied from the air discharge channel 40, and discharges the diluted gas to the outside.

Further, the air supply valve 54 is provided between the hydrogen supply channel 28 and the air supply channel 35 connected to the fuel cell 14. The air supply valve 54 is opened at the time of supplying the compressed air into the fuel gas flow field 148 through the hydrogen supply port 20 and the air inlet channel 53, i.e., at the time of the scavenging process on the anode side using air.

Except the back pressure control valve 38, the hydrogen supply valve 44, the air supply valve 54, the hydrogen purge valve 30, and the drain valve 50 are ON/OFF valves, respectively.

Further, in the fuel cell system 10, and the fuel cell vehicle 12 equipped with the fuel cell system 10, a control device 70 is provided. The control device 70 controls the entire operation of the fuel cell system 10 and the fuel cell vehicle 12, including opening/closing of various valves of the fuel cell system 10 and the fuel cell vehicle 12, control of the load 18, control of auxiliary devices such as the air compressor 36, and control of charging/discharging the energy storage 16.

The control device 70 comprises a computer (ECU), and operates as means for achieving various functions by executing programs stored in a memory based on various inputs. In the embodiment, for example, the control device 70 is operated as all or part of start up/stop means, anode scavenging means, replacement determination means, start up prohibition means, first start up permission means, cathode scavenging means, second start up permission means, time counting (counter, timer) means, and various other functional means.

In FIG. 1, solid lines denote power lines, narrow solid lines denote signal lines, and double lines denote pipes.

During normal power generation operation of the fuel cell system 10, by the valve control of the control device 70, basically, the hydrogen supply valve 44 is opened, and the back pressure control valve 38 is opened by a suitable degree. Though the hydrogen purge valve 30 and the drain valve 50 are opened as necessary, normally, the hydrogen purge valve 30 and the drain valve 50 are closed. Further, normally, the air supply valve 54 is closed.

During the normal power generation operation, the fuel gas is supplied from the hydrogen tank 42 into the hydrogen supply channel 28 through the ejector 48, and then, the fuel gas is supplied to the hydrogen supply port 20 of the fuel cell 14.

The fuel gas supplied to the hydrogen supply port 20 flows through the fuel gas flow field 148 of each cell, and flows along the anode for inducing an electrochemical reaction at the anode. Then, after the fuel gas is partially consumed at the anode, the fuel gas is discharged as an exhaust gas containing water and unconsumed hydrogen from the hydrogen discharge port 22, and flows through the hydrogen circulation channel 46.

The exhaust gas discharged to the hydrogen circulation channel 46 returns to a position in the middle of the hydrogen supply channel 28 by sucking action of the ejector 48, and is supplied again to the fuel cell 14 as the fuel gas. The fuel gas contains water, i.e., the fuel gas is humidified gas.

During the normal power generation, the compressor 102 compresses the outside air, and supplies the compressed air to the air supply channel 34. Air, i.e., the oxygen-containing gas is supplied to the air supply port 24, and in each cell, the oxygen-containing gas flows through the oxygen-containing gas flow field 146 along the cathode for inducing an electrochemical reaction at the cathode. After air is consumed at the cathode, an exhaust gas containing the unconsumed air is discharged from the air discharge port 26 into the air discharge channel 40.

Thus, in each of the cells, the hydrogen as the fuel gas supplied to the anode and the oxygen in the oxygen-containing gas supplied to the cathode are consumed in the electrochemical reactions for generating electricity. The generated electrical energy is supplied to the load 18, the air compressor 36, and the energy storage 16.

After power generation continues for a predetermined period of time, the water generated at the cathode is retained in the oxygen-containing gas flow field 146 and passes through the electrolyte membrane and the anode to the fuel gas flow field 148. Thus, the water is also retained in the fuel gas flow field 148.

That is, in the fuel cell 14, when power generation is started, initially, liquid droplets are produced in the oxygen-containing gas flow field 146. After power generation is performed for a predetermined period of time, liquid droplets are also produced in the fuel gas flow field 148.

During the normal power generation, in the fuel cell vehicle 12 equipped with the fuel cell system 10, the control device 70 calculates the required electrical energy based on the pedal position Ap of the accelerator pedal, the vehicle speed Vs, or the like. Further, based on the calculated required electrical energy, the control device 70 implements various controls, e.g., sends control signals to the fuel cell 14, the load 18, the air compressor 36, and the back pressure control valve 38 or the like.

Further, in order to reliably implement the control of the load 18, and the control of starting operation of the fuel cell system 10 at low temperature such as the temperature below the freezing point, the control device 70 receives signals indicating the outside temperature Ta, the gas temperature Th in the hydrogen discharge port 22, the pressure P1 in the hydrogen supply channel 28, the pressure P2 in the air supply channel 34, and the hydrogen concentration Dh in the discharge channel 94 from the outside air temperature sensor 74, the temperature sensor 71, the pressure sensors 91, 92, and the hydrogen concentration sensor 93, respectively.

Further, an ignition switch (IG switch) 76 as start up/stop means is connected to the control device 70. The ignition switch 76 outputs an ON signal (signal for switching operation of the fuel cell system 10 from the OFF state to the ON state) as a start up signal IGon (signal for starting operation) and an OFF signal (signal for switching operation of the fuel cell system 10 from the ON state to the OFF state) as a stop signal IGoff for the fuel cell vehicle 12 and the fuel cell system 10.

Figure 2:
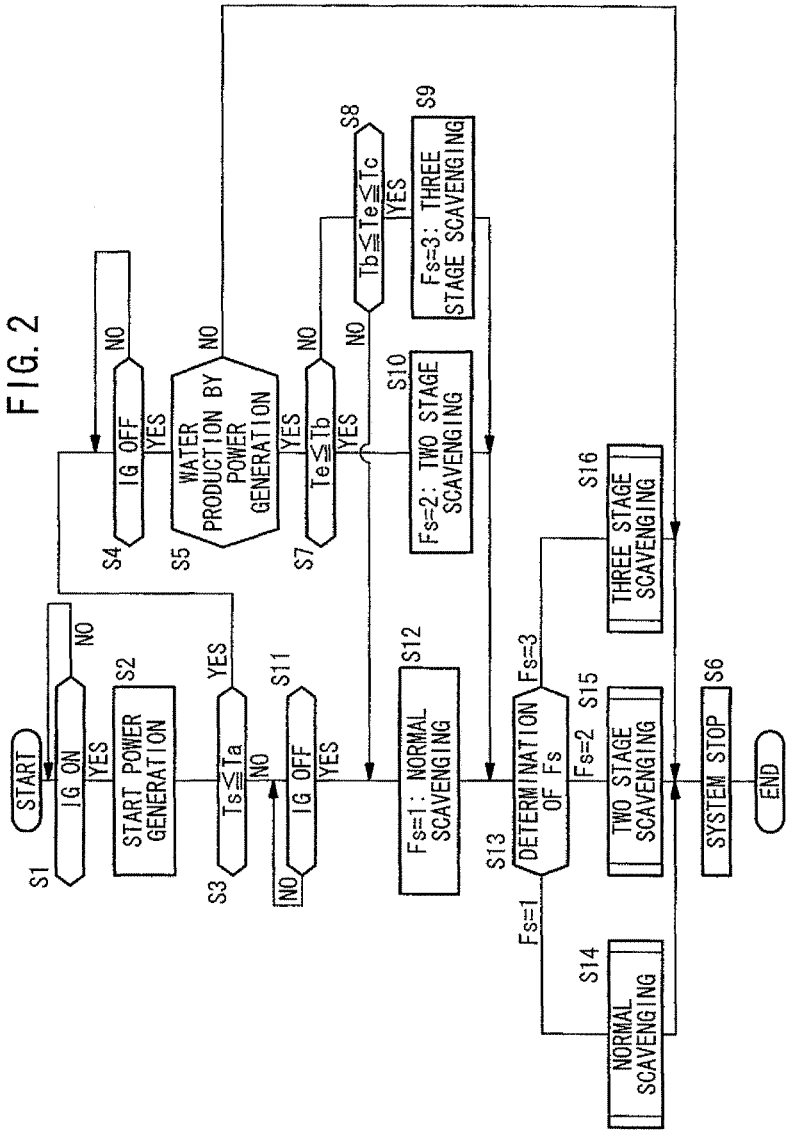
FIG. 2 is a flow chart showing the overall operation of a scavenging process.

Basic structure and operation of the fuel cell system 10 and the fuel cell vehicle 12 equipped with the fuel cell system 10 have been described above. Next, before describing operation of start up control for the fuel cell system 10, the two stage scavenging process and the three stage scavenging process will be described with reference to a flow chart in FIG. 2.

In step S1, when the control device 70 detects a start up signal IGon from the ignition switch 76 of the fuel cell system 10 (fuel cell vehicle 12), in step S2, power generation of the fuel cell 14 is started.

Next, in step S3, the temperature Th of the fuel cell 14 is detected by the temperature sensor 71 provided at the hydrogen discharge port 22, and it is determined whether the temperature Th of the fuel cell 14 (Th=Ts) immediately after starting power generation is a preset temperature (threshold) Ta or less. For example, the predetermined value is the freezing temperature of 0° C. (Ta=0° C.) which is generally considered as the low temperature.

Then, if the temperature Th (Th=Ts) of the fuel cell 14 immediately after starting power generation is a preset temperature Ta or less (Ts=Ta), in step S4, it is determined whether a stop signal IGoff from the ignition switch 76 has been received or not.

If the stop signal IGoff is received, it is determined that a stop request is received during power generation after starting operation of the fuel cell 14 (step S1). In the next step S5, it is determined whether water is produced in the fuel cell 14 by power generation of the fuel cell 14 from the time of starting the current operation (step S1: YES) to the time of receiving the stop request (step S4: YES).

The determination of step S7 is made based on the amount of electrical energy generated in the fuel cell 14 from the time of starting the current operation to the time of receiving the stop request, i.e., the accumulated power generation amount [Wh] calculated by the control device 70.

In step S5, for example, if it is determined that the water is not produced, it is not necessary to perform the scavenging process. Therefore, without performing the scavenging process, in step S6, for example, the normal stop process for the fuel cell system 10 is performed (for example, the hydrogen supply valve 44 is closed, and the air compressor 36 is stopped).

In step S5, if it is determined that water is produced, in step S7, the temperature Th of the fuel cell 14 (the temperature Th is the temperature Te when the stop request is received at the time of stopping the current operation) is detected by the temperature sensor 71, and it is determined whether the temperature Th (Th=Te) immediately after the stop signal IGoff is received from the ignition switch 76 is a preset temperature (threshold value) Tb or less. The temperature Tb (Ta<Tb) is determined in advance, and data of the temperature Tb is stored in a memory. The determination of step S7 is based on a threshold for determining the state in which water is produced only in the oxygen-containing gas flow field 146 side because no significant time has elapsed after starting power generation, and water is not transmitted to the fuel gas flow field 148 side.

Further, the determination of step S7 may be made by considering whether the accumulated power generation amount from the time of starting the current operation (step S1: YES) to the time of turning off the ignition (step S4: YES) is a predetermined accumulated power generation amount or less.

If the determination in step S7 is false (NO), i.e., if the temperature Th (Th=Te) of the fuel cell 14 exceeds the preset temperature Tb, in step S8, it is determined whether the temperature Th (Th=Te) of the fuel cell 14 detected in step S7 is the preset temperature (threshold) Tc or less (Tb≤Te≤Tc).

The temperature Tc (Tb<Tc) is determined in advance, and data of the temperature Tc is stored in a memory. Step S8 is intended to determine whether water is produced in both of the oxygen-containing gas flow field 146 and the fuel gas flow field 148. That is, the preset temperature Tc is a threshold for determining that the water is produced in both of the oxygen-containing gas flow field 146 and the fuel gas flow field 148.

If the determination of step S8 is true (YES), or the determination of step S7 is true, reception of the stop signal IGoff from the ignition switch 76 (operation of turning off the ignition switch 76) is determined as operation of requesting to stop operation of the fuel cell system 10 after power generation for a short period of time at low temperature.

If the determination in step S8 is true (YES), in step S9, a value "3" for the three stage scavenging process is set to a scavenging process flag Fs based on the request to stop operation of the fuel cell system 10 after power generation for a short period of time at low temperature (Fs=3).

Also, if it determination of step S7 is true, reception of the stop signal IGoff from the ignition switch 76 in step S4 is determined as operation of requesting to stop operation of the fuel cell system 10 after power generation for a short period of time at low temperature. In step S10, a value "2" for the two stage scavenging process is set to a scavenging process flag Fs based on the request to stop operation of the fuel cell system 10 after power generation for a short period of time at low temperature (Fs=2).

Further, in the determination of step S3, if the temperature Th (Th=Ts) of the fuel cell 14 immediately after starting power generation exceeds a preset temperature Ta (Ta=0° C.) (Ts>Ta), and thereafter, in step S11, the stop signal IGoff from the ignition switch 76 is received, and in step S8, the temperature Th (Th=Te) of the fuel cell 14 exceeds a preset temperature Tc (Te>Tc), it is determined that reception of the stop signal IGoff from the ignition switch 76 is for the case in which operation of the fuel cell system 10 is not started at low temperature, or it is determined that reception of the stop signal IGoff from the ignition switch 76 is for the case in which even if operation of the fuel cell system 10 is started at low temperature, power generation has been performed for a sufficient period of time. That is, reception of the stop signal IGoff from the ignition switch 76 is not determined as operation of requesting to stop operation of the fuel cell system 10 after power generation for a short period of time at low temperature. In step S12, the scavenging process flag Fs is set (Fs=1), and thus, the scavenging process flag Fs has a default value for the normal scavenging process.

Then, in step S13, it is determined what the scavenging process flag Fs is. If the value of the scavenging flag Fs is "1", in step S14, the normal scavenging process (cathode scavenging step) when the fuel cell 14 is stopped normally is performed. If the value of the scavenging flag Fs is "2", in step S15, the two stage scavenging process (cathode scavenging step) is performed. If the value of the scavenging flag Fs is "3", in step S16, the three stage scavenging process (cathode scavenging process and anode scavenging step) is performed.

After any of the scavenging processes is performed, the system stop process in step S6 is performed.

Next, objects and details of the normal scavenging process in step S14, the two stage scavenging process in step S15, and the three stage scavenging process in step S16 will be described with reference to flow charts and time charts.

Figure 3:
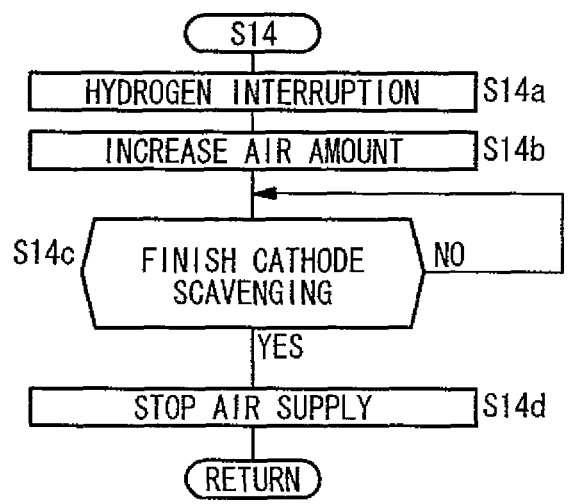
FIG. 3 is a flow chart showing a normal scavenging process.

Firstly, with reference to a flow chart of FIG. 3, operation of the normal scavenging process in step S14 will be described.

In the process, in step S14a, the control device 70 closes (interrupts) the hydrogen supply valve 44 to stop the supply of the fuel gas to the fuel cell 14.

Then, in step S14b, the amount of air discharged from the air compressor 36 is increased. The dry air at the large flow rate is supplied into the fuel cell 14 from the air supply port 24.

By air at the large flow rate supplied into the fuel cell 14, the water (liquid droplets) or the like in the oxygen-containing gas flow field 146 of the fuel cell 14 is discharged to the outside through the air discharge port 26, the back pressure control valve 38, the air discharge channel 40, the dilution box 90, and the discharge channel 94. In this manner, the scavenging process on the cathode side is started.

Then, in step S14c, when the scavenging process on the cathode side is finished after a predetermined period of time has elapsed, in step S14d, operation of the air compressor 36 is stopped to stop supply of air to the fuel cell 14. At this time, the back pressure control valve 38 is fully opened, and the oxygen-containing gas flow field 146 is opened to the outside. Thus, the normal scavenging process is finished. In the normal scavenging process, the oxygen-containing gas as the scavenging gas is supplied only to the cathode side, i.e., only to the oxygen-containing gas flow field 146. The oxygen-containing gas as the scavenging process is not supplied to the anode side, i.e., to the fuel gas flow field 148.

Then, the routine returns to step S6 to place the fuel cell system 10 into the system stop state.

In the normal scavenging process, since operation of the fuel cell system 10 is stopped a short period of time after detection of the OFF state of the ignition switch 76 in step S13, the operator of the fuel cell vehicle 12 such as the driver does not feel a sense of discomfort.

Figure 4:
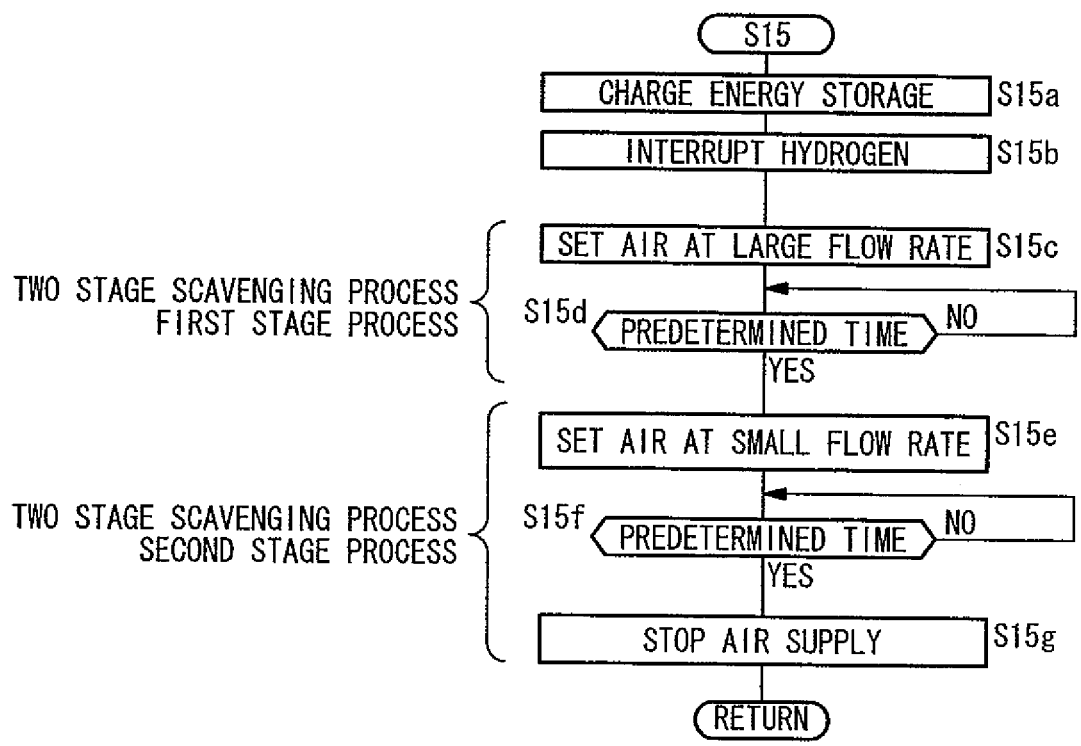
FIG. 4 is a flow chart showing a two stage scavenging process.
Figure 5:
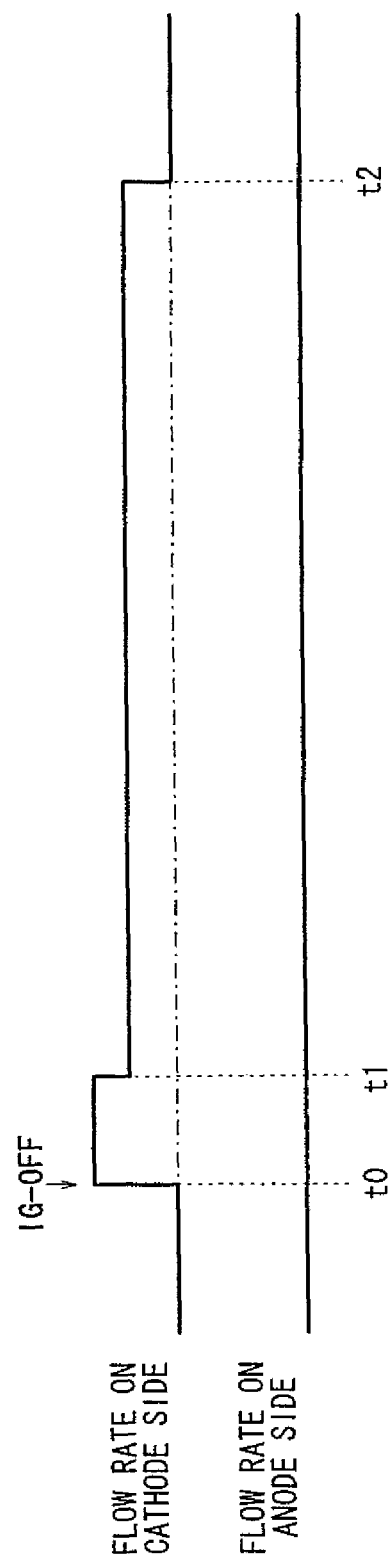
FIG. 5 is a time chart showing the two stage scavenging process.

Next, with reference to a flow chart of FIG. 4 and a time chart of FIG. 5, operation of the two stage scavenging process performed in step S15 in the case where the current reception of the stop signal IGoff from the ignition switch 76 in step S4 is a request to stop operation of the fuel cell system 10 after power generation for a short period of time at low temperature, and water is produced only in the oxygen-containing gas flow field 146 on the cathode side will be described.

In the process, in order to reliably implement the system stop control, and start the next operation of the fuel cell system 10 at low temperature such as the temperature below the freezing point, at time t0, when the stop signal IGoff from the ignition switch 76 is detected, firstly, in step S15a, the energy storage 16 is charged to a predetermined capacity level using the power generation current. Since a capacitor is used as the energy storage 16, charging of the energy storage 16 is finished in a very short period of time.

After charging is finished, in step S15b, the hydrogen supply valve 44 is closed, and the supply of the fuel gas to the fuel cell 14 is stopped.

Then, in steps S15c and S15d, the first stage process of the two stage scavenging process for discharging liquid droplets in the oxygen-containing gas flow field 146 is performed (time t0 to time t1). At this time, in step S15c, the flow rate of air discharged from the air compressor 36 is increased (time t0), and air at the large flow rate is supplied to the oxygen-containing gas flow field 146 for a predetermined period of time (time t0 to time t1) in step S15d for discharging (removing) liquid droplets remaining in the oxygen-containing gas flow field 146.

After liquid droplets are discharged from the oxygen-containing gas flow field 146 by the first stage process of the two stage scavenging process, in steps S15e to S15g, the cathode of the fuel cell 14 is dried, and the second stage process of the two stage scavenging process for reliably starting the next operation of the fuel cell system 10 at low temperature such as the temperature below the freezing point is performed (time t1 to time t2).

At this time, in step S15e, operation of the air compressor 36 is suppressed to supply air at the small flow rate. The air at the small flow rate is supplied to the oxygen-containing gas flow field 146 (time t1).

Then, in step S15f, the air at the small flow rate is supplied into the oxygen-containing gas flow field 146 for a predetermined period of time, to reliably start the next operation at the low temperature (time t1 to time t2).

Then, in step S15g, operation of the air compressor 36 is stopped, and the second stage process of the two stage scavenging process is finished. In this manner, the two stage scavenging process is finished.

Thus, in step S4, when the stop signal IGoff from the ignition switch 76 is received, if it is determined that the reception of the stop signal IGoff is a stop request to stop operation of the fuel cell system 10 after power generation for a short period of time at low temperature, and water is produced only in the oxygen-containing gas flow field 146 on the cathode side, the two stage scavenging process is performed. In the two stage scavenging process, the liquid droplets in the oxygen-containing gas flow field 146 are discharged at the large flow rate for a short period of time, and then, the cathode of the oxygen-containing gas flow field 146 is dried using air at the small flow rate for a long period of time. In this manner, it is possible to achieve the reliable performance for starting the next operation of the fuel cell system 10 at low temperature such as the temperature below the freezing point. As can be seen from FIG. 5, in the two stage scavenging process, the oxygen-containing gas as the scavenging gas is supplied only to the oxygen-containing gas flow field 146 on the cathode side, and the oxygen-containing gas as the scavenging gas is not supplied to the fuel gas flow field 148 on the anode side.

Though the first stage process of the two stage scavenging process and the second stage process of the two stage scavenging process that have been described with reference to the time chart of FIG. 5 and the flow chart of FIG. 4 are performed temporally continuously, when the stop signal IGoff from the ignition switch 76 is received, the first stage process of the two stage scavenging process may be performed, and the second stage process of the two stage scavenging process may be performed a predetermined period of time after the first stage process of the two stage scavenging process is performed, i.e., these processes may be performed intermittently, and separately.

Figure 6:
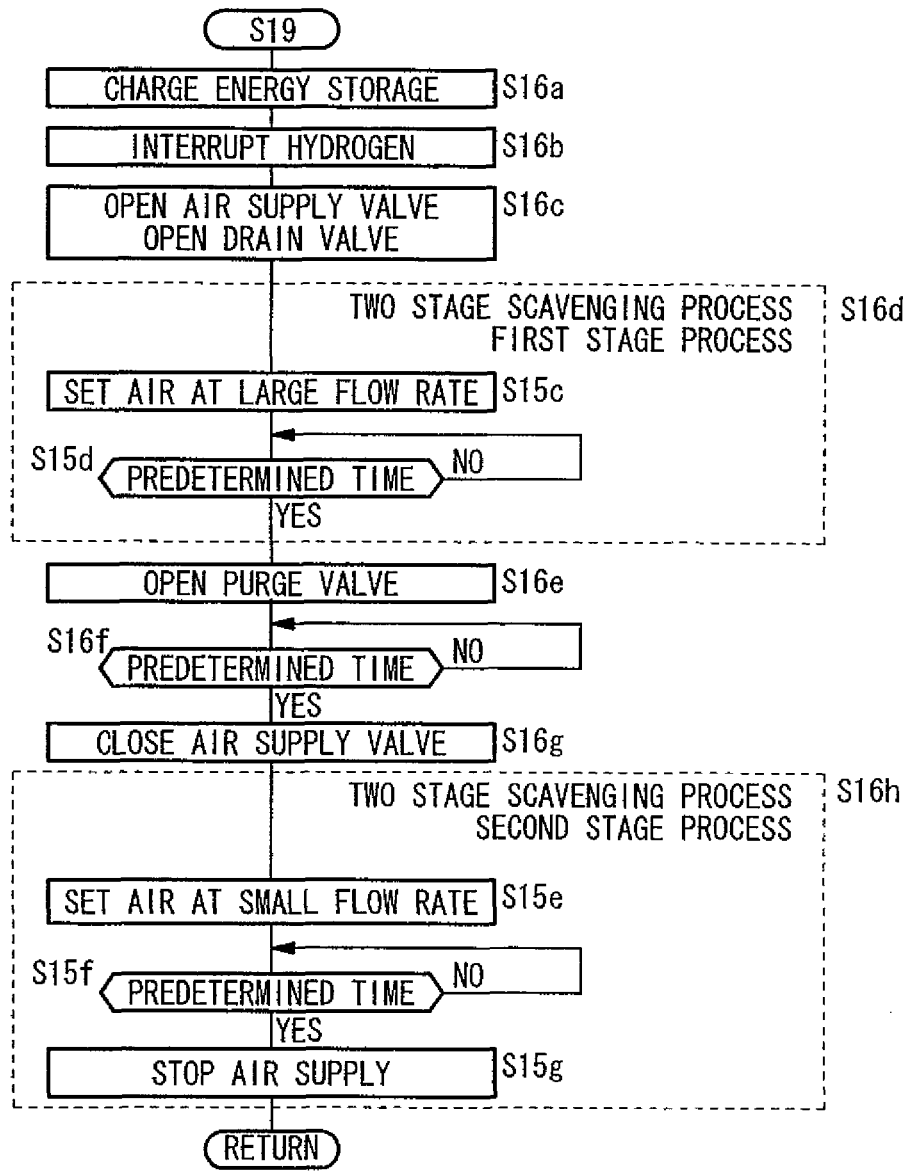
FIG. 6 is a flow chart showing a three stage scavenging process.
Figure 7:
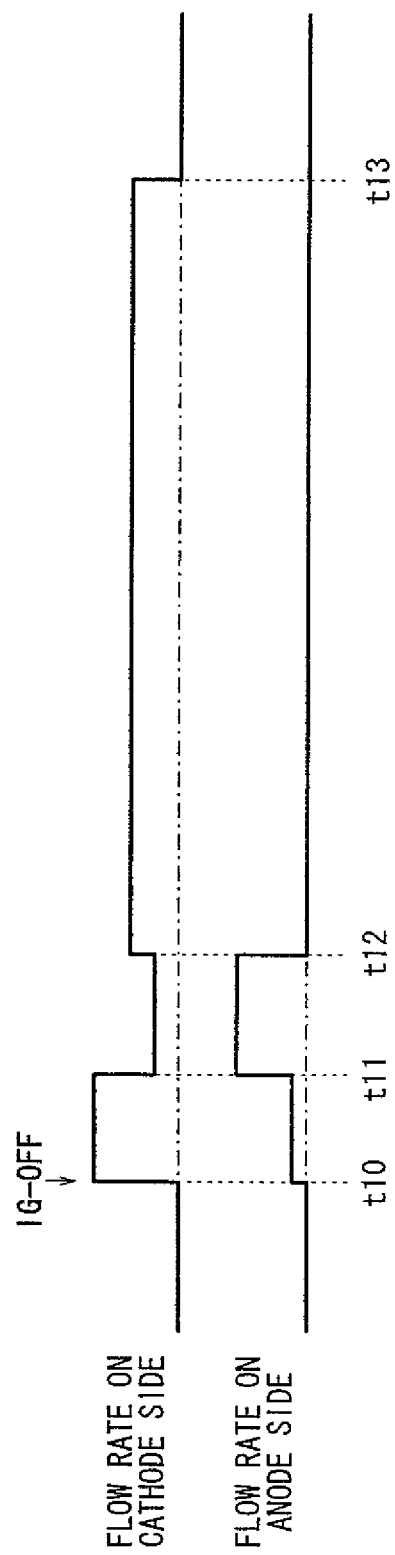
FIG. 7 is a time chart showing a three stage scavenging process.

Next, with reference to a flow chart of FIG. 6 and a time chart of FIG. 7, operation of the three stage scavenging process performed in step S16 in the case where the current reception of the stop signal IGoff from the ignition switch 76 in step S6 is a request to stop operation of the fuel cell system 10 after power generation for a short period of time at low temperature, and water is produced in both of the oxygen-containing gas flow field 146 on the cathode side and the fuel gas flow field 148 on the anode side will be described.

In the process, in order to reliably implement the system stop control, and start the next operation of the fuel cell system 10 at low temperature such as the temperature below the freezing point, at time t10, when the stop signal IGoff from the ignition switch 76 is detected, firstly, in step S16a, the energy storage 16 is charged to a predetermined capacity level using the power generation current.

After charging is finished, in step S16b, the hydrogen supply valve 44 is closed, and the supply of the fuel gas to the fuel cell 14 is stopped.

Then, in step S16c, in order to satisfy the dilution requirement of the fuel gas discharged from the fuel cell system 10 to the outside, the drain valve 50 at the relatively small flow rate is opened, and the air supply valve 54 is opened (time t10).

In step S16d, the first stage process of the two stage scavenging process which is identical to the process of steps S15c and S15d as described with reference to the flow chart of FIG. 4, i.e., the scavenging process for discharging the liquid droplets in the oxygen-containing gas flow field 146 on the cathode side is performed at the large flow rate for a short period of time (time t10 to time t11). Therefore, in the period from time t10 to time t11, as described above, air at the large flow rate flows through the oxygen-containing gas flow field 146 for discharging (removing) the liquid droplets from the oxygen-containing gas flow field 146.

Since the air supply valve 54 is opened at time t10, air is supplied also into the fuel gas flow field 148 after the time t10. The hydrogen purge valve 30 at the large flow rate is closed, and the drain valve 50 at the small flow rate is opened. Therefore, the air at the small flow rate flows into the fuel gas flow field 148. The fuel gas discharged from the fuel gas flow field 148, the drain valve 50 through the discharge channel 52 and the oxygen-containing gas at the large flow rate discharged from the air discharge channel 40 are mixed together through the dilution box 90, and the diluted fuel gas is discharged to the outside through the discharge channel 94.

In this manner, the liquid droplets are discharged from the oxygen-containing gas flow field 146, and the fuel gas is diluted, and discharged at time t11, without increasing the concentration of the discharged fuel gas. From time t11, a process of discharging (removing) liquid droplets from the fuel gas flow field 148 is performed.

In the process, in step S16e, the hydrogen purge valve 30 at the large flow rate is opened (time t11). Thus, air at the large flow rate is supplied into the fuel gas flow field 148 where the diluted fuel gas remains, for a predetermined period of time in step S16f (time t11 to time t12), and the liquid droplets in the fuel gas flow field 148 are discharged (removed) together with the diluted fuel gas. Then, in step S16g, the air supply valve 54 is closed (time t12).

At time t10 to t12, the liquid droplets in the oxygen-containing gas flow field 146 and the liquid droplets in the fuel gas flow field 148 are removed in separated periods of time so that the flow rate in the oxygen-containing gas flow field 146 and the flow rate in the fuel gas flow field 148 do not become large at the same time. Thus, it is possible to restrict operation of the air compressor 36, and achieve noise reduction. As a result, in comparison with the case of the conventional technique, it is possible to use a small/light air compressor with small capacity as the air compressor 36. Further, from time t10 to t11, the fuel gas is gradually diluted, and the diluted gas is discharged to the outside. Therefore, it is not necessary to supply the oxygen-containing gas to the dilution box 90 only for the purpose of diluting the fuel gas.

Then, in step S16h, the second stage process of the two stage scavenging process that is identical to the process of steps S15e to S15g as described with reference to the flow chart of FIG. 4, i.e., the process of drying the fuel cell 14 on the cathode side, for reliably starting the next operation at low temperature such as the temperature below the freezing point is performed (time t12 to time t13).

In this manner, by performing the three stage scavenging process in the case where it is determined that reception of the stop signal IGoff from the ignition switch 76 is the request to stop operation after power generation for a short period of time at low temperature, and water is produced in both of the oxygen-containing gas flow field 146 on the cathode side and the fuel gas flow field 148 on the anode side, it is possible to reliably achieve the stable performance for starting the next operation at low temperature such as the temperature below the freezing point. As a result, in the three stage scavenging process, the oxygen-containing gas as the scavenging gas is supplied to both of the oxygen-containing gas flow field 146 on the cathode side and the fuel gas flow field 148 on the anode side.

Though the first stage process of the two stage scavenging process and the second stage process of the two stage scavenging process in the three stage scavenging process that have been described with reference to the flow chart of FIG. 6 and the time chart of FIG. 7 are performed temporally continuously, when the stop signal IGoff from the ignition switch 76 is received, the first stage process of the two stage scavenging process may be performed when the stop signal IGoff is received from the ignition switch 76, and the second stage process of the two stage scavenging process and the process of removing the liquid droplets from the fuel gas flow field 148 may be performed a predetermined period of time after the first stage process of the two stage scavenging process is performed (after a predetermined condition is satisfied), i.e., these processes may be performed intermittently, and separately.

The two stage scavenging process and the three stage scavenging process have been described above.

Next, start up control operation of the fuel cell system 10 according to the embodiment will be described with reference to a flow chart of FIG. 8 and time charts of FIGS. 9 to 11.

The time chart of FIG. 9 will be described briefly. During the power generation mode, a stop signal IGoff from the ignition switch 76 is received at time t0 (step S4: YES), the scavenging process of the two stage scavenging mode (step S21: two stage scavenging) is performed on the cathode side at the large flow rate (time t0 to time t1), and at the time t1a in the middle of the scavenging process on the cathode side at the small flow rate, if the start up signal IGon from the ignition switch 76 is received, at the time t1a, immediately, the process of steps S28 and S29 is performed to enter the power generation mode (step S31).

The time chart of FIG. 10 will be described briefly. During the power generation mode, a stop signal IGoff from the ignition switch 76 is received at time t10 (step S4: YES), the scavenging process of the three stage scavenging mode (step S21: three stage scavenging) is performed on the cathode side at the large flow rate (time t10 to time t11), and at the time t11a in the middle of the scavenging process on the anode side at the large flow rate, if the start up signal IGon from the ignition switch 76 is received (step S24: YES), at the time t11a, without immediately entering the power generation mode, the restart of operation is prohibited during a period from time t10 (or time t11) to t12 (t12a) which is considered to be required for completely replacing the gas in the fuel gas flow field 148 by the oxygen-containing gas (step S27: NO). After the prohibition is released, and the restart of operation is permitted (step S27: YES), the process of steps S28 and S29 is performed to enter the power generation mode (step S31).

The time chart of FIG. 11 will be described briefly. At time t12b after time t12a of the time chart of FIG. 10, when the stop signal IGoff from the ignition switch 76 is received again (step S30: YES), the remaining process of the three stage scavenging process continues, and operation of the system is stopped (step S32→step S6). Thus, the period of the time required to stop the system is reduced.

Figure 8:
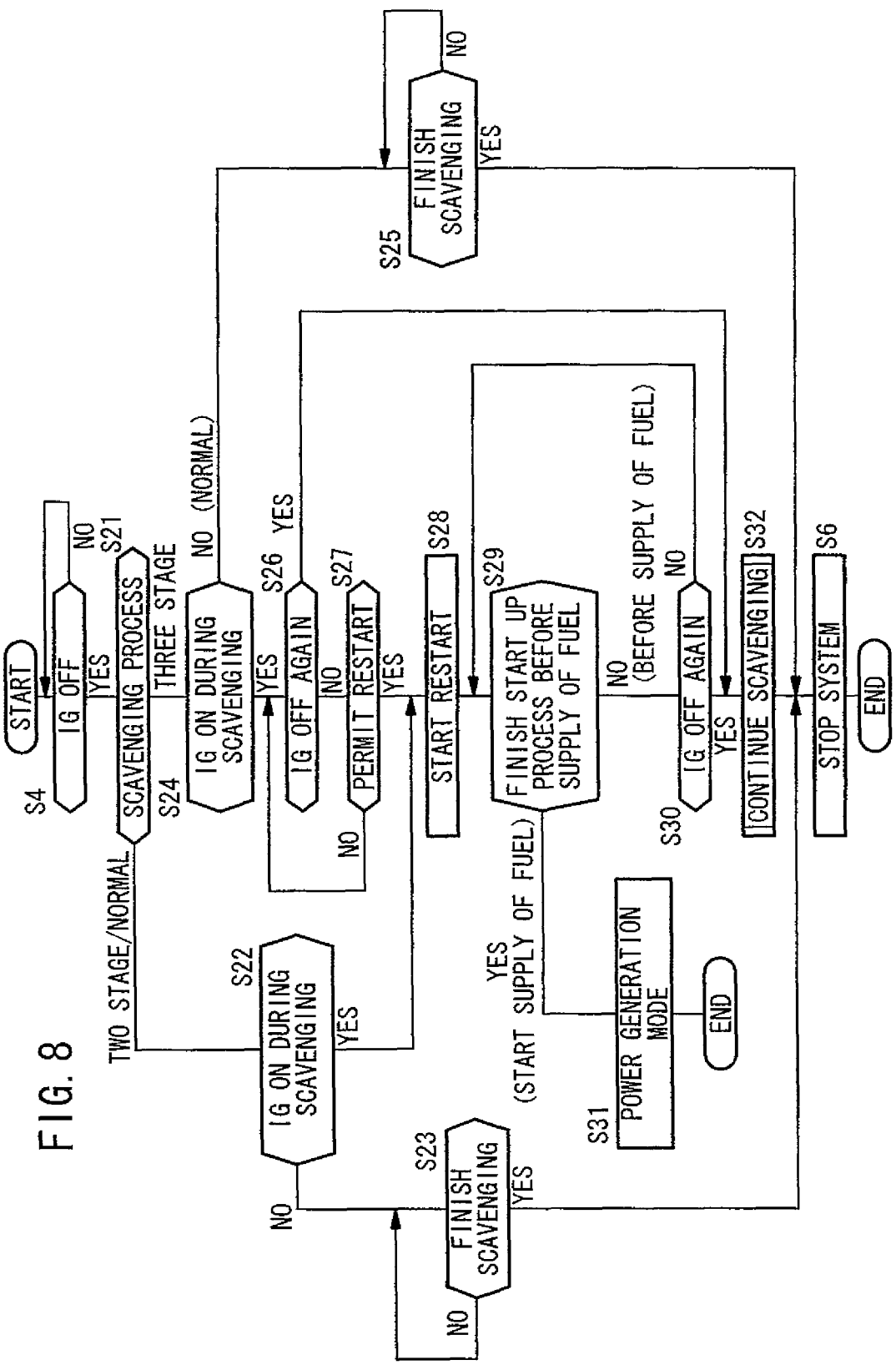
FIG. 8 is a flow chart showing operation of a restart control process according to the embodiment of the present invention.

Then, in the flow chart of FIG. 8, firstly, in step S4 (same as step S4 of FIG. 2), when the stop signal IGoff from the ignition switch 76 is received, in step S21, based on the value of the flag Fs in step S13 (see FIG. 2), the type of the scavenging process is determined. When it is determined that the two stage scavenging process or the normal stage scavenging process is in operation, then, in step S22, during the scavenging process, it is determined whether the start up signal IGon from the ignition switch 76 has been received or not. If the start up signal IGon has not been received, when the finish of the two stage scavenging process or the normal scavenging process (step S14d, step S15g) is detected in step S23, the system stop process in step S6 is performed.

In step S21, if it is determined that the three stage scavenging process is in operation, in step S24, during the three stage scavenging process, it is determined whether the start up signal IGon from the ignition switch 76 has been received again or not. If the start up signal IGon has not been received, when the finish of the three stage scavenging process (step S15g of step S16h) is detected in step S25, the system stop process in step S6 is performed.

In step S24, if the start up signal IGon from the ignition switch 76 has been received, in step S26, it is determined whether the stop signal IGoff from the ignition switch 76 have been received again.

In step S26, if it is determined that the stop signal IGoff have not been received, in step S27, it is determined whether the restart of the power generation of the fuel cell 14 is permitted or not.

Figure 10:
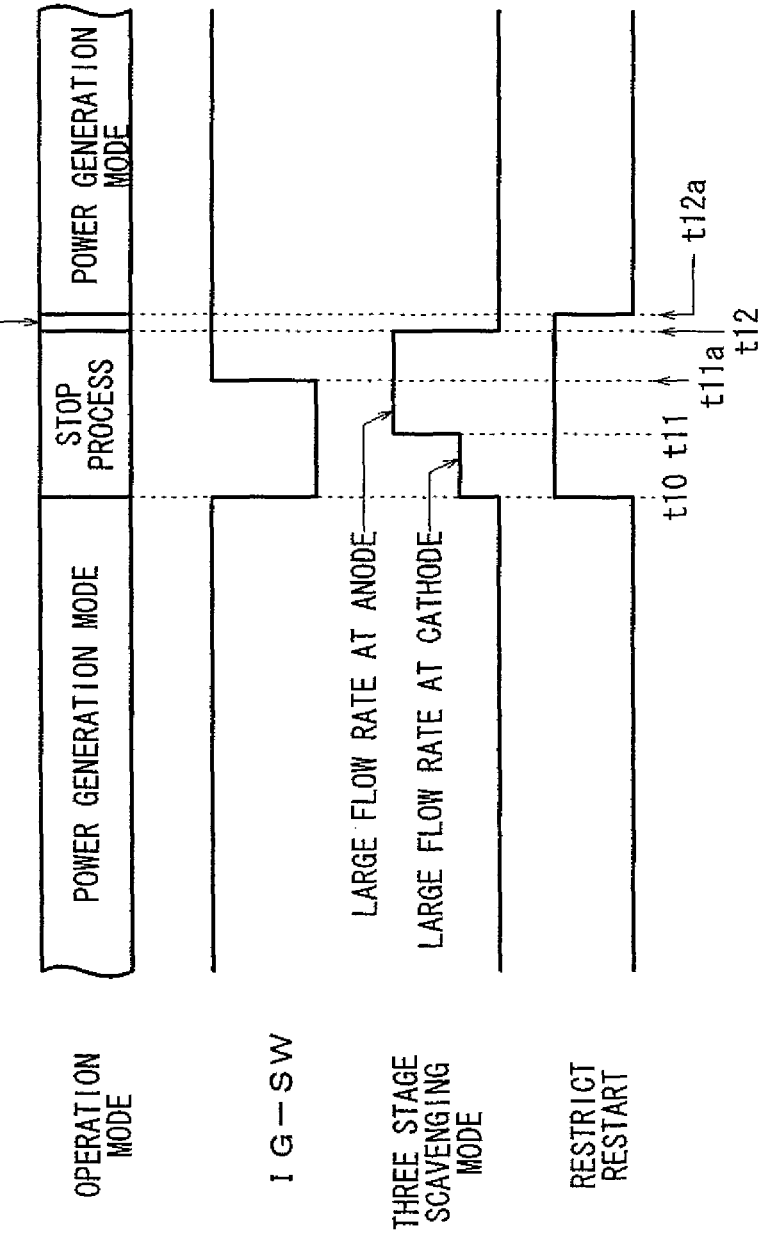
FIG. 10 is a time chart showing a restart control process in the three stage scavenging process.
Figure 11:
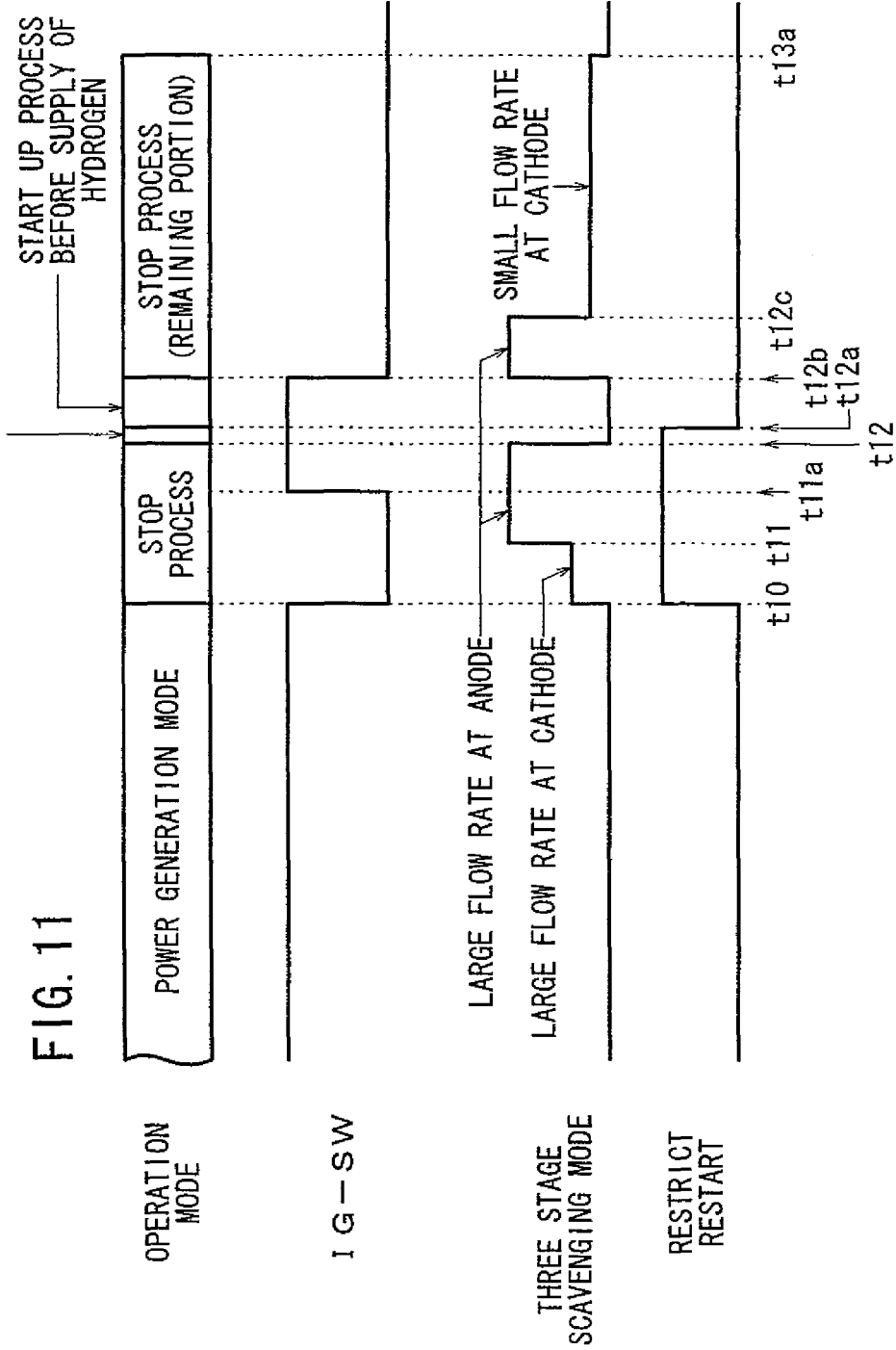
FIG. 11 is a time chart showing another restart control process in the three stage scavenging process.

As shown in FIGS. 10 and 11, the process of determining whether the restart of power generation of the fuel cell 14 is permitted or not can be carried out as follows. During the power generation mode, when the stop signal IGoff is received in step S4 at time t10, the stop process is started. The timer starts time counting from time t10 when the air supply valve 54 is opened in step S16c. The timer counts a predetermined period of time until the time t12 when it can be regarded that the gas in the fuel gas flow field 148 has been replaced completely by the oxygen-containing gas (scavenging gas). Further, in step S27, determination for permission of the restart of the power generation of the fuel cell 14 can be made when it is determined that the gas in the fuel gas flow field 148 has been replaced completely by the oxygen-containing gas (scavenging gas) when the hydrogen concentration Dh detected by the hydrogen concentration sensor 93 becomes a predetermined concentration or less, in addition to the time when the timer counts the predetermined period of time.

At time t12 when determination in step S27 is made, as can be seen from the time chart of the three stage scavenging mode in FIGS. 10 and 11, the air supply valve 54 is closed, and the hydrogen purge valve 30 and the drain valve 50 are closed.

Then, in step S28 (time t12a), a command of starting the restart of operation of the fuel cell system 10 based on the reception of the start up signal in step S24 is supplied as a command for opening the hydrogen supply valve 44 and a command for driving the air compressor 36.

In FIGS. 10 and 11, during the period from time t10 to time t12a, the restart is restricted. The restart restriction period includes the predetermined period of time (t10 to t12) counted by the timer in step S27, and the period of time (t12 to t12a) required for performing the failure detection process for the air supply valve 54 when the hydrogen concentration Dh detected by the hydrogen concentration sensor 93 becomes the predetermined concentration or less. The time required for performing a failure detection process for the air supply valve 54 is a very short period of time, compared with the time required for performing the process of determining whether the restarting of the power generation of the fuel cell 14 is performed or not in step S27. Therefore, in effect, the period of time (t10 to t12) required for performing the process of determining whether the restart of the power generation of the fuel cell 14 is permitted or not in step S27 is considered as the restart restriction period.

In the case where, in step S21, it is determined that the two stage scavenging process or the normal scavenging process is in operation, and in step S22, the start up signal IGon from the ignition switch 76 is received again during the scavenging process (e.g., in the period from time t0 to t2 in FIG. 5), since the oxygen-containing gas as the scavenging gas is not supplied into the fuel gas flow field 148, without the determination as to the restart permission in step S27, in step S28 (time t12a), the command of starting the restart of the power generation of the fuel cell 14 based on the reception of the start up signal in step S24 is supplied as the command of opening the hydrogen supply valve 44 and the command of driving the air compressor 36.

Figure 9:
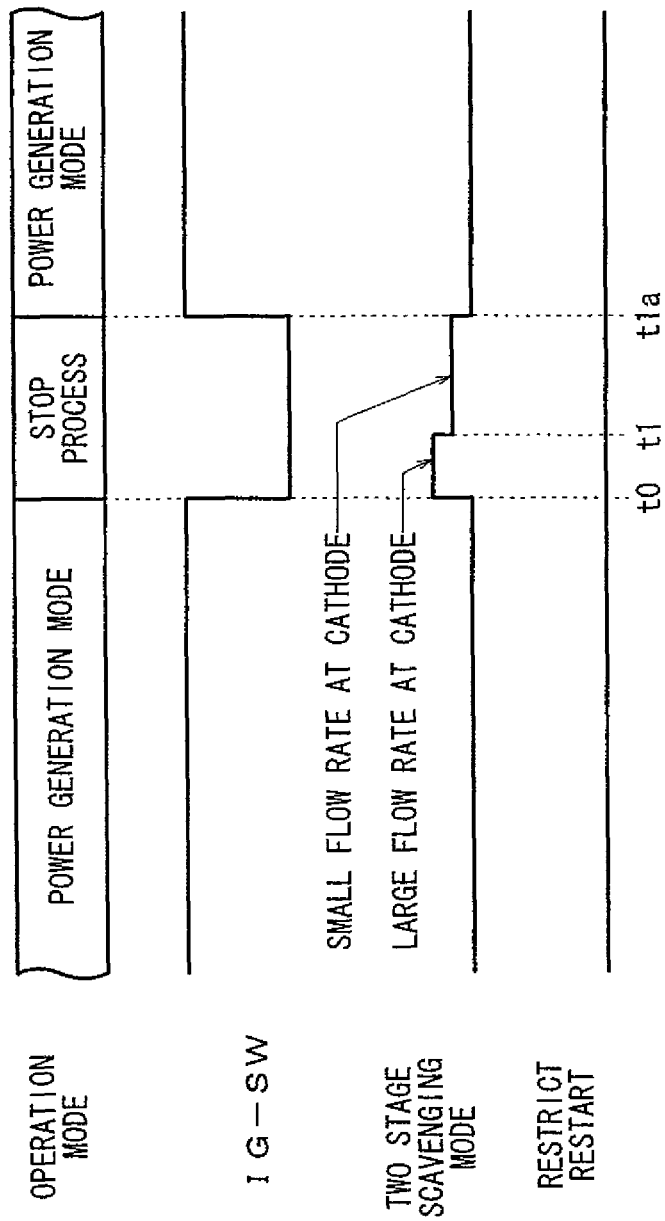
FIG. 9 is a time chart showing a restart control process in the two stage scavenging process.

For example, as shown in FIG. 9, at time t0, after the stop signal IGoff from the ignition switch 76 is received (step S4: YES), when the start signal IGon is received again at time t1a in the middle of the scavenging process on the cathode side at the small flow rate after time t1 (step S22: YES), in step S28 (time t1a), the command of starting the restart of the power generation of the fuel cell 14 is outputted from the control device 70.

Then, in step S29, it is determined whether the process of starting operation of the fuel cell system 10 before supplying the fuel is finished or not. At the time of starting operation of the fuel cell system 10, when the hydrogen supply valve 44 is opened, the pressure on one side (high pressure hydrogen tank 42 side) of the hydrogen supply valve 44 is high, and the pressure on the other side (ejector 48 side) of the hydrogen supply valve 44 is slightly higher than the atmospheric pressure. Therefore, a pilot operated solenoid valve which requires a small force to open is used for the hydrogen supply valve 44. In the pilot operated valve, after the command of opening the valve is supplied, firstly, a pilot valve is opened by a small force before opening a main valve. After the pressure on the upstream side of the main valve and the pressure on the downstream side of the main valve become substantially equal, the main valve is opened. Therefore, after supplying the valve open command to the hydrogen supply valve 44, it takes a certain period of time t0 actually open the hydrogen supply valve 44. It is possible to detect whether the hydrogen supply valve 44 has been opened or not based on the increase in the pressure value P1 of the pressure sensor 91. The period of time required for starting operation of the fuel cell system 10 before the supply of the fuel in step S29 depends on the time required for opening the hydrogen supply valve 44.

In the case where the determination of step S29 as to the finish of the start up process has not been made, in step S30, it is monitored whether the stop signal IGoff from the ignition switch 76 has been received or not. In step S29, if it is determined that the start up process has been finished (step S29: YES) without the reception of the stop signal IGoff, in step S31, by entering the power generation mode (see FIGS. 9 and 10) to start normal power generation, the start up control process is finished.

In the case where the stop signal IGoff from the ignition switch 76 is received again before the finish of the start up process in step S29, in step S32, the remaining two stage scavenging process or the remaining three stage scavenging process continues.

That is, in the case where the start up signal IGon from the ignition switch 76 is received in step S22, and the stop signal IGoff from the ignition switch 76 is received again in step S30 during the second stage scavenging process, since the scavenging process on the anode side by the oxygen-containing gas is not performed, the remaining process from the time when the scavenging process is interrupted in the period from time t0 to time t2 shown in FIG. 5, to the time t2 (the scavenging process on the cathode side at the large flow rate or the scavenging process on the cathode side at the small flow rate) continues.

Further, during the three stage scavenging process in the case where it is determined that the restart of operation is permitted in step S27, since the replacement of the gas in the fuel gas flow field 148 by air from time t11 to t12 in FIG. 7 has been finished, the scavenging process on the cathode side at the small flow rate from time t12 is in operation. If the stop signal IGoff from the ignition switch 76 is received in step S30, the scavenging process on the cathode side at the small flow rate for the remaining period from the time when the scavenging process is interrupted in the period from time t12 to time t13, to the time t13 is performed.

That is, with reference to FIG. 11, from time t12a, the start up process before the supply of the fuel gas in step S29 is performed, and in the middle of the start up process, at time t12b, if the stop signal IGoff from the ignition switch 76 is received (step S30: YES), the scavenging process on the anode side at the large flow rate is performed in the remaining period from time t12b to time t12c, and the scavenging process on the cathode side at the small flow rate is performed in the period from t12c to t13a (same as the period from time t12 to time t13 in FIG. 7).

After the remaining scavenging process is finished in step S32, the system stop process in step S6 is performed.

During the normal scavenging process, if the stop signal IGoff from the ignition switch 76 is received after the start up signal IGon from the ignition switch 76 is received in step S22, in step S32, the scavenging process on the cathode side continues for the period remaining in the period of time determined in step S14c.

In the example of the start up control process described with reference to the flow chart of FIG. 8, the start up signal IGon from the ignition switch 76 is received during the normal scavenging process, the two stage scavenging process, or the three stage scavenging process. However, the present invention is not limited in this respect. For example, as shown in a flow chart of FIG. 12, instead of the determination process in step S21, even if it is determined whether it is in the "anode scavenging" in step S41, the process of other steps S22 to S32 after the determination of step S21 can be used directly.

Figure 12:
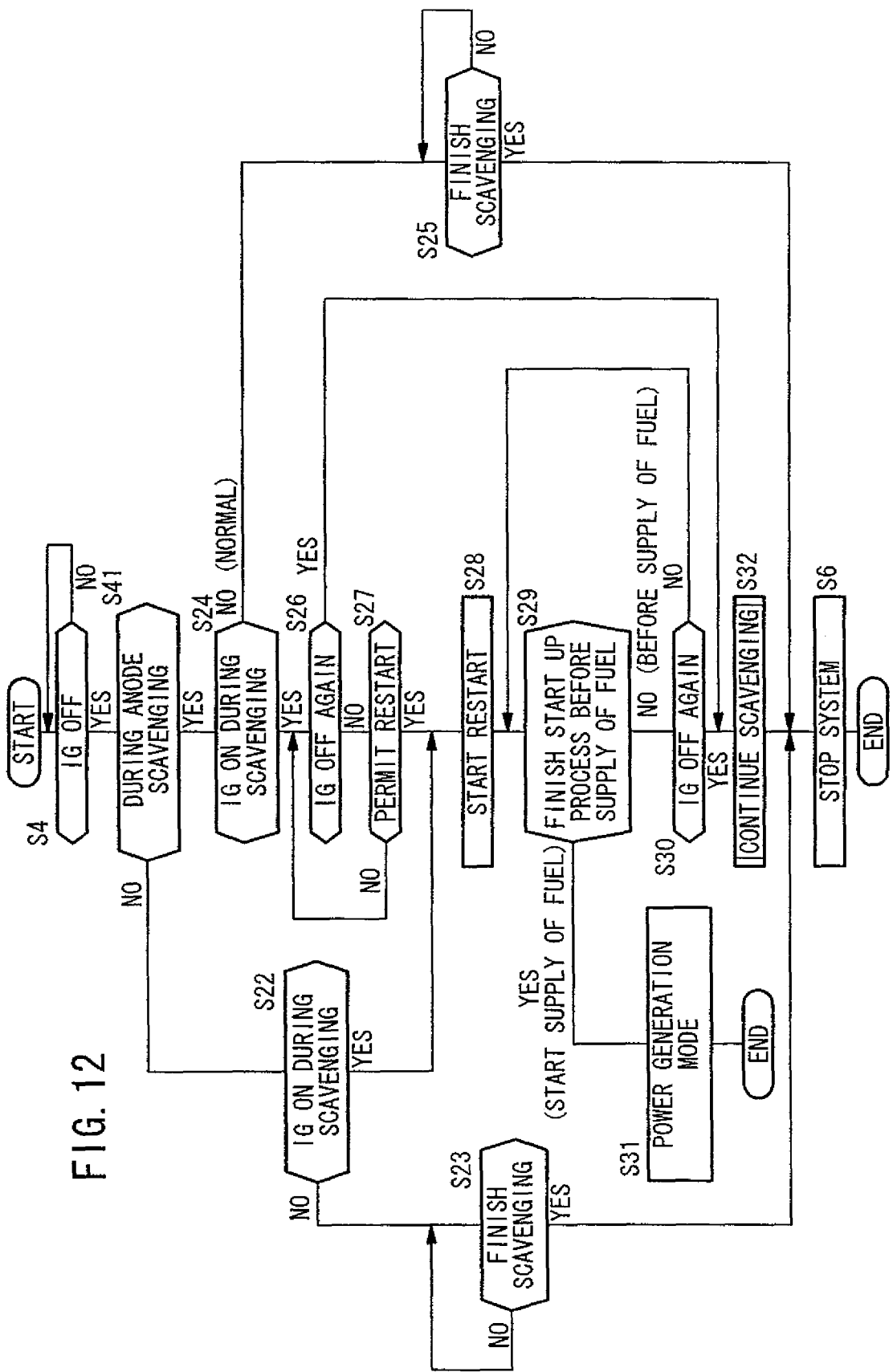
FIG. 12 is a flow chart showing a restart control process according to another embodiment of the present invention.

The flow chart of FIG. 12 showing the determination of step S41 is applicable to any fuel cell system adopting the scavenging technique in which in step S4, when the stop signal IGoff from the ignition switch 76 is received, the scavenging process on the anode side using air is performed, or the scavenging process on the anode side using air and the scavenging process on the cathode side using air are performed, and thereafter, the scavenging process using air on the cathode side is performed.

As described above, the embodiment is applicable to the fuel cell system 10 including the fuel cell 14 operated for power generation consuming the fuel gas supplied to the anode and the oxygen-containing gas supplied to the cathode, the ignition switch 76 as start up/stop means for outputting the start up signal IGon for starting operation of the fuel cell 14 and the stop signal IGoff for stopping operation of the fuel cell 14, and the air supply valve 54 as the anode scavenging means for scavenging of the fuel gas at the anode using the oxygen-containing gas as the scavenging gas, and the present invention can be implemented in the following first to fifth examples.

It should be noted that, as the scavenging gas, instead of using the oxygen-containing gas, other gases such as a nitrogen gas may be used.

First Example

The fuel cell system 10 includes the fuel cell 14 operated for power generation consuming the fuel gas supplied to the anode and the oxygen-containing gas supplied to the cathode, the ignition switch 76 as the start up/stop means for outputting the start up signal IGon for starting operation of the fuel cell 14 and the stop signal IGoff for stopping operation of the fuel cell 14, and the air supply valve 54 as the anode scavenging means for scavenging of the fuel gas at the anode using the scavenging gas (oxygen-containing gas in this example) when the stop signal IGoff is received. The fuel cell system 10 further includes the replacement determination means (step S27) for determining that the fuel gas at the anode has been replaced by the scavenging gas, and the start up prohibition means (step S27: NO) for prohibiting the start up of the fuel cell 14 during a period in which the fuel gas at the anode has not been replaced by the scavenging gas, when scavenging of the anode is performed using the scavenging gas in response to the stop signal, and the start up signal is received during the scavenging of the anode.

In the first example, during the scavenging of the anode using the scavenging gas, when the start up signal IGon is received (step S24: YES), during the period in which the fuel gas at the anode has not been replaced by the scavenging gas, it is possible to easily perform the fuel gas replacement at the time of start up as usual. Thus, power generation stability at the time of restarting operation, i.e., the performance of starting operation is not degraded.

In the case where scavenging of the anode is performed using the scavenging gas, at the time of stopping the system, if the gas in the gas channel on the anode side has not been replaced completely by the scavenging gas, at the time of restarting of the fuel cell 14, it is difficult to accurately keep track of the fuel gas concentration at the anode. If operation of the fuel cell 14 is restarted when the scavenging gas and the fuel gas are mixed together, at the time of stopping operation, it is difficult to determine the amount of the fuel gas remaining in the fuel gas flow field 148 at the anode. For example, the amount of the discharged fuel gas may be increased undesirably. Therefore, at the time of restarting, the gas in the fuel gas flow field 148 at the anode should be replaced completely by the scavenging gas to facilitate the fuel gas replacement control.

Second Example

In addition to the components of the first example, the fuel cell system 10 further includes the first start up permission means (first start up permission step, step S27: YES) for permitting the start up of the fuel cell 14 by releasing prohibition of the start up by the start up prohibition means (step S27: NO), when scavenging of the anode is performed using the scavenging gas in response to the stop signal IGoff (step S4: YES), and the start up signal is received during the scavenging of the anode by the scavenging gas (step S24: YES), and when it is determined that the fuel gas at the anode has been replaced by the scavenging gas (step S27: YES).

In the second example, if the minimum condition is satisfied, i.e., if it is determined that the fuel gas at the anode has been replaced by the scavenging gas, the start up of the fuel cell 14 is permitted. Therefore, it is possible to reduce the time required for restarting operation of the fuel cell 14.

Third Example

In addition to the components of the first example or the second example, the fuel cell system 10 further includes the air compressor 36 as the cathode scavenging means for scavenging the cathode using the scavenging gas when the stop signal IGoff is received (step S4: YES), before scavenging of the anode using the scavenging gas by opening the air supply valve 54, and the second start up permission means (second start up permission step, step S28) for permitting the start up of the fuel cell 14 when scavenging of the cathode is performed using the scavenging gas in response to the stop signal (step 21: NO), and the start up signal IGoff is received during the scavenging of the cathode (step S22: YES).

In the third example, when the stop signal IGoff is received, and scavenging of the cathode is performed using the scavenging gas before scavenging of the anode using the scavenging gas, if the start up signal IGon is received during the scavenging of the cathode, the start up of the fuel cell 14 is permitted. That is, the scavenging of the cathode is irrelevant to (does not contribute to) the fuel gas replacement at the anode at the time of restarting operations, by permitting the start up immediately, it is possible to reduce the time required to restart operation of the fuel cell 14.

Fourth Example

In addition to the components of the second example or the third example, the fuel cell system 10 further includes the scavenging continuation means (scavenging continuation step, step S32) for continuing the remaining scavenging process immediately before power generation of the fuel cell 14 is permitted by the first start up permission means (step S27: YES) or the second start up permission means (step S28), if the stop signal is received (step S30: YES) before the fuel gas is supplied to the anode (step S29: NO).

In the fourth example, in the case where the interrupted scavenging can be resumed, instead of performing the entire scavenging process from the beginning, by continuing the remaining scavenging process, it is possible to reduce the time required for restarting operation. After the first stop signal IGoff is received (step S4: YES), and the scavenging process is started, if the start up signal IGon is received (step S22: YES), and a condition for permitting power generation of the fuel cell 14 is satisfied, a certain period of time is required before the fuel gas is supplied to the anode. Therefore, if the stop signal IGoff is received before the fuel gas is supplied to the anode (step S30: YES), the state of the fuel gas and/or the oxygen-containing gas in the flow field of the anode and/or the cathode is same as the state immediately before the reception of the start up signal IGon (step S22: YES) after the reception of the first start up signal IGoff (step S4: YES). Therefore, it is sufficient to perform the remaining scavenging process. As a result, it is possible to reduce the time required to stop the system. At the time of stopping the fuel cell system 10, the operator does not feel a sense of discomfort.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system, comprising:
    a fuel cell operated for power generation consuming a fuel gas supplied to an anode and an oxygen-containing gas supplied to a cathode;
    start up/stop means for outputting a start up signal for starting operation of said fuel cell and a stop signal for stopping operation of said fuel cell;
    anode scavenging means for scavenging the fuel gas at said anode using a scavenging gas when the stop signal is received;
    replacement determination means for determining that the fuel gas at said anode has been replaced by the scavenging gas; and
    start up prohibition means for prohibiting the start up of said fuel cell during a period in which the fuel gas at said anode has not been replaced by the scavenging gas, when scavenging of said anode is performed using the scavenging gas in response to the stop signal, and the start up signal is received during the scavenging of said anode.

2. A fuel cell system according to claim 1, further comprising first start up permission means for permitting the start up of said fuel cell by releasing prohibition of the start up by said start up prohibition means, when scavenging of said anode is performed using the scavenging gas in response to the stop signal, and the start up signal is received during the scavenging of the anode, and when it is determined that the fuel gas at said anode has been replaced by the scavenging gas.

3. A fuel cell system according to claim 1, further comprising:
    cathode scavenging means for scavenging said cathode using the scavenging gas when the stop signal is received, before scavenging of said anode by said anode scavenging means using the scavenging gas; and
    second start up permission means for permitting the start up of said fuel cell when scavenging of said cathode is performed in response to the stop signal, and the start up signal is received during the scavenging of said cathode.

4. A fuel cell system according to claim 2, further comprising:
    cathode scavenging means for scavenging said cathode using the scavenging gas when the stop signal is received, before scavenging of said anode by said anode scavenging means using the scavenging gas; and second start up permission means for permitting the start up of said fuel cell when scavenging of said cathode is performed in response to the stop signal, and the start up signal is received during the scavenging of said cathode.

5. A fuel cell system according to claim 2, further comprising:

scavenging continuation means for continuing a remaining scavenging process immediately before power generation of said fuel cell is permitted by said first start up permission means, if the power generation of said fuel cell is permitted by said first start up permission means and the stop signal is received again before the fuel gas is supplied to said anode.

6. A fuel cell system according to claim 3, further comprising:

scavenging continuation means for continuing a remaining scavenging process immediately before power generation of said fuel cell is permitted by said second start up permission means, if the power generation of said fuel cell is permitted by said second start up permission means and the stop signal is received again before the fuel gas is supplied to said anode.

7. A fuel cell system according to claim 4, further comprising:

scavenging continuation means for continuing a remaining scavenging process immediately before power generation of said fuel cell is permitted by said second start up permission means, if the power generation of said fuel cell is permitted by said second start up permission means and the stop signal is received again before the fuel gas is supplied to said anode.

8. A start up control method for a fuel cell operated for power generation consuming a fuel gas supplied to an anode and an oxygen-containing gas supplied to a cathode and receiving a start up signal for starting operation of said fuel cell and a stop signal for stopping operation of said fuel cell, the start up control method comprising the steps of:

determining that the fuel gas at said anode has been replaced by a scavenging gas; and prohibiting the start up of said fuel cell before the fuel gas at said anode has been replaced by the scavenging gas, when the start up signal is received during scavenging of said anode being performed in response to the stop signal.

9. A start up control method for a fuel cell system according to claim 8, further comprising the step of permitting the start up of said fuel cell as a first start up permitting step by releasing prohibition of the start up by said start up prohibiting step, when scavenging of said anode is performed using the scavenging gas in response to the stop signal, and the start up signal is received during the scavenging of the anode, and when it is determined that the fuel gas at said anode has been replaced by the scavenging gas.

10. A start up control method for a fuel cell system according to claim 8, further comprising the steps of:

scavenging said cathode using the scavenging gas when the stop signal is received, before scavenging of said anode using the scavenging gas; and permitting the start up of said fuel cell as a second start up permitting step when scavenging of said cathode is performed in response to the stop signal, and the start up signal is received during the scavenging of said cathode.

11. A start up control method for a fuel cell system according to claim 9, further comprising the steps of:

scavenging said cathode using the scavenging gas when the stop signal is received, before scavenging of said anode using the scavenging gas; and permitting the start up of said fuel cell as a second start up permitting step when scavenging of said cathode is performed in response to the stop signal, and the start up signal is received during the scavenging of said cathode.

12. A start up control method for a fuel cell system according to claim 9, further comprising the step of continuing a remaining scavenging process immediately before power generation of said fuel cell is permitted by said first start up permitting step, if the power generation of said fuel cell is permitted by said first start up permitting step and the stop signal is received again before the fuel gas is supplied to said anode.

13. A start up control method for a fuel cell system according to claim 10, further comprising the step of continuing a remaining scavenging process immediately before power generation of said fuel cell is permitted by said second start up permitting step, if the power generation of said fuel cell is permitted by said second start up permitting step and the stop signal is received again before the fuel gas is supplied to said anode.

14. A start up control method for a fuel cell system according to claim 11, further comprising the step of continuing a remaining scavenging process immediately before power generation of said fuel cell is permitted by said second start up permitting step, if the power generation of said fuel cell is permitted by said second start up permitting step and the stop signal is received again before the fuel gas is supplied to said anode.

* * * * *